(12) United States Patent
Gouby et al.

(10) Patent No.: US 10,094,740 B2
(45) Date of Patent: Oct. 9, 2018

(54) NON-REGRESSION METHOD OF A TOOL FOR DESIGNING A MONITORING SYSTEM OF AN AIRCRAFT ENGINE

(71) Applicant: SAFRAN AIRCRAFT ENGINES, Paris (FR)

(72) Inventors: Aurelie Gouby, Quincy-sous-Senart (FR); Jerome Henri Noel Lacaille, Rosny sous Bois (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 865 days.

(21) Appl. No.: 14/506,901

(22) Filed: Oct. 6, 2014

(65) Prior Publication Data

US 2015/0120214 A1 Apr. 30, 2015

(30) Foreign Application Priority Data

Oct. 24, 2013 (FR) ..................... 13 60356

(51) Int. Cl.
*A61B 3/00* (2006.01)
*G02B 27/01* (2006.01)
(Continued)

(52) U.S. Cl.
CPC ........... *G01M 15/00* (2013.01); *G06F 11/277* (2013.01); *G06F 11/3688* (2013.01)

(58) Field of Classification Search
CPC ............. G06F 11/3688; G06F 11/3624; G06F 11/3672; G06F 9/44505; G06F 9/45558;
(Continued)

(56) References Cited

U.S. PATENT DOCUMENTS 8,271,232 B1 9/2012 Roucis et al.
8,473,176 B2 * 6/2013 Youngquist ............ G01K 7/021
123/169 R
(Continued)

FOREIGN PATENT DOCUMENTS

FR 2 957 170 A1 9/2011
GB 2 460 407 12/2009

OTHER PUBLICATIONS

Gaston et al., Test purpose generation for service evolutions: a symbolic approach, Aug. 2009, 4 pages.*
(Continued)

*Primary Examiner* — Thuy Dao
(74) *Attorney, Agent, or Firm* — Oblon, McClelland, Maier & Neustadt, L.L.P.

(57) ABSTRACT

A system of non-regression tests of a designing tool including modules used to build a monitoring device of an aircraft engine is provided. The system includes a processor configured to automatically create an experience base by instrumenting behavior tests upon executing the modules, the experience base including reference input signals, sets of reference parameters, reference output signals, and collections of results of reference executions relating to the modules; start again the behavior tests on the modules depending on the corresponding reference input signals and the corresponding sets of reference parameters thus generating test output signals and collections of results of test executions; and compare the test output signals with the corresponding reference output signals and the collections of results of test execution with the corresponding collections of results of reference executions in order to test the non-regression of the designing tool.

9 Claims, 5 Drawing Sheets

(51) Int. Cl.
 *A61B 5/00* (2006.01)
 *G01M 15/00* (2006.01)
 *G06F 11/36* (2006.01)
 *G06F 11/277* (2006.01)

(58) Field of Classification Search
 CPC . G06F 11/277; A61B 5/1455; A61B 5/14532; A61B 2562/0238; A61B 2562/0204; A61B 2562/0219; G01M 15/00
 See application file for complete search history.

(56) References Cited

U.S. PATENT DOCUMENTS

| | | | | |
|---|---|---|---|---|
| 8,672,258 | B1* | 3/2014 | Tillotson | B64C 1/1484 244/1 R |
| 8,744,651 | B2* | 6/2014 | Bates | G05B 23/0254 701/14 |
| 8,797,842 | B2* | 8/2014 | Dame | H04L 12/40026 361/601 |
| 8,868,284 | B2* | 10/2014 | Isom | G06Q 10/06311 701/31.4 |
| 9,037,320 | B1* | 5/2015 | Kesler | B64D 45/00 701/14 |
| 9,326,714 | B2* | 5/2016 | Say | A61M 5/1723 |
| 2005/0270017 | A1* | 12/2005 | Du | G01R 31/2806 324/763.01 |
| 2006/0225048 | A1 | 10/2006 | Jakubiak | |
| 2009/0177936 | A1* | 7/2009 | Koenemann | G01R 31/31703 714/737 |
| 2010/0146337 | A1* | 6/2010 | Dessertenne | G06F 11/2221 714/27 |
| 2010/0161240 | A1* | 6/2010 | Tseng | A61B 5/14532 702/22 |
| 2015/0143342 | A1* | 5/2015 | Chandnani | G06F 11/3616 717/126 |
| 2015/0193329 | A1* | 7/2015 | Strode | G06F 11/0709 717/125 |
| 2016/0088136 | A1* | 3/2016 | Di Donato | H04M 1/21 600/365 |

OTHER PUBLICATIONS

U.S. Appl. No. 14/438,129, filed Apr. 23, 2015, Lacaille, et al.

French Preliminary Search Report dated Jun. 23, 2014 in French Application 13 60356, filed on Oct. 24, 2013 ( with English Translation of Categories of Cited Documents).

Jerome Lacaille: "Validation of Health-Monitoring Algorithms for Civil Aircraft Engines" XP031657181, Aerospace Conference, 2010 IEEE, 11 pages.

* cited by examiner

NON-REGRESSION METHOD OF A TOOL FOR DESIGNING A MONITORING SYSTEM OF AN AIRCRAFT ENGINE

TECHNICAL FIELD

The present invention relates to a tool for designing a monitoring system of an aircraft engine, and more particularly, a method and a system of non-regression tests of the designing tool.

STATE OF PRIOR ART

Different monitoring systems of aircraft engines have been implemented to check that different equipment of the aircraft engine is in good working order. There are for example, a monitoring system to analyse the behaviour of the engine during the ignition process, another to analyse the gas path, still another one to detect filter clogging, and another one to analyse oil consumption, etc.

All these monitoring systems are for improving security and reliability of aircraft engines. In particular, they enable in-flight shutdowns to be avoided or restricted, delays or flight cancellations to be reduced, and more particularly, facilitate engine maintenance by anticipating failures and identifying faulty or failing components.

However, designing each monitoring system requires specific complex means to solve different technical aspects of monitoring related to each particular equipment of the engine. For this, a model specific to the monitored equipment should be built and test and validation data corresponding to this engine equipment should be managed. Thus, for each equipment, a lot of resources and time should be utilised to model, develop and validate the corresponding monitoring system.

In particular, the validation of a monitoring system is a step which requires to handle a very great number of data which demand a significant computing time in order to analyse them. Further, it is important to make the right choice as to the validation indicators in order to avoid that an anomaly is signalled by mistake or that an element of the engine is faulty without detecting the event. Further, the validation level of a monitoring system may happen to be different from that of another monitoring system. This can complicate the analysis of data from different monitoring systems of the engine.

Patent application FR2957170 of the applicant solves these problems by providing a tool for designing a monitoring system of an aircraft engine. This tool is comprised of generic unit modules integrating algorithmic functions dedicated to specific tasks. The modules are instantiated as a function of the monitoring application.

The designing tool enables a modelling environment independent of the applicative context to be defined while allowing a reliable validation and a re-use of the modules for different tasks or applications.

However, the modules are likely to be upgraded. For example, specific requests to an engine component can result in a modification or improvement of the module. This can have an impact on other applications using this same module.

Analogously, the environment wherein these modules are developed can also be upgraded. Indeed, the programming language of the algorithmic codes as well as the operating system of the machines used can be upgraded or continuously updated. These modifications can also have effects on the operation of the modules.

Consequently, the object of the present invention is to overcome the abovementioned drawbacks by providing a method of non-regression tests of the tool for designing a monitoring system of an aircraft engine, enabling the impact of a modification onto the behaviour of one or more modules of the designing tool to be quickly detected.

DISCLOSURE OF THE INVENTION

The present invention is defined by a method of non-regression tests of a tool for designing a monitoring device of an aircraft engine, said tool including modules used to build the monitoring device, each module integrating algorithmic functions dedicated to specific tasks and being configured by a set of parameters, each module being adapted to be executed on an input signal to deliver an output signal, said method including the following steps of:

automatically creating an experience base by instrumenting behaviour tests upon executing the modules, said experience base including reference input signals, sets of reference parameters, reference output signals, and collections of results of reference executions relating to said modules, starting again said behaviour tests on said modules depending on the corresponding reference input signals and the corresponding sets of reference parameters thus generating test output signals and collections of results of test executions, and comparing said test output signals with the corresponding reference output signals and said collections of results of test executions with said corresponding collections of results of reference executions in order to test the non-regression of the designing tool.

This method has an automatic mechanism of tests ensuring the non-regression of the modules and a quality monitoring of the results thus enabling the monitoring security and reliability of aircraft engines to be improved.

Advantageously, upon executing a module, creating the experience base includes the following steps of:

creating collections of instances of reference modules for the different modules, each module being associated with a collection of instances of reference modules and each instance of reference module being defined by the algorithmic functions of the corresponding module, as well as by its set of reference parameters, each instance of reference module being associated with a reference input signal, a reference output signal, and a collection of results of reference executions, and recording the different instances of reference modules of a same module in a storage system.

Advantageously, the collection of results of reference executions associated with an instance of reference module includes a reference execution flow rate and a reference execution duration.

Advantageously, the non-regression test of a module to be tested includes the following steps of:

creating a collection of instances of test module associated with the collection of instances of reference module corresponding to said module to be tested, assigning for each instance of test module the set of reference parameters of the instance of the corresponding reference module, executing each instance of test module on the reference input signal of the instance of the corresponding reference module to generate a test output signal and a corresponding collection of results of test executions, said collection of results of test executions including a test execution flow rate and a test execution duration, comparing the test execution flow rate of each instance of test module with the reference execution flow rate of the instance of the corresponding reference module, comparing the test output signal of each instance of test module with the reference output signal of the instance of the corresponding reference module, and comparing the test execution duration of each instance of test module with the reference execution duration of the instance of the corresponding reference module.

Advantageously, the non-regression test of said module to be tested includes the following steps:

calculating an execution flow rate deviation between the test execution flow rate of each instance of test module and the reference execution flow rate of the instance of the corresponding reference module, and comparing said execution flow rate deviation with a flow rate threshold, checking a non-regressive equality between the test output signal of each instance of test module and the reference output signal of the instance of the corresponding reference module, and calculating an execution duration deviation between the test execution duration of each instance of test module and the reference execution duration of the instance of the corresponding reference module, and comparing said execution duration deviation with a duration threshold.

According to a preferred embodiment of the present invention, the method includes a reexecution one by one of the instances of reference modules recorded in the experience base in order to test the non-regression of the different modules.

Advantageously, the method includes automatically triggering a regression alert in case the non-regression test is not validated for at least one module, the alert being accompanied by a regression report including an identifier of each module concerned as well as the corresponding non-regression test.

The invention also aims at a system of non-regression tests of a tool for designing a monitoring device of an aircraft engine, said designing tool including modules used to build the monitoring device, each module integrating algorithmic functions dedicated to specific tasks and being configured by a set of parameters, each module being adapted to be executed on an input signal to deliver an output signal, said system of tests including:

processing means configured to automatically create an experience base by instrumenting behaviour tests upon executing the modules, said experience base including reference input signals, sets of reference parameters, reference output signals, and collections of results of reference executions relating to said modules, processing means configured to start again said behaviour tests on said modules depending on the corresponding reference input signals and the corresponding sets of reference parameters thus generating test output signals and collections of results of test executions, and processing means configured to compare said test output signals with the corresponding reference output signals and said collections of results of test executions with said corresponding collections of results of reference executions in order to test the non-regression of the designing tool.

The invention also aims at a tool for designing a monitoring device of an aircraft engine, including modules used to build the monitoring device, each module integrating algorithmic functions dedicated to specific tasks and being configured by a set of parameters, each module being adapted to be executed on an input signal to deliver an output signal, characterised in that said designing tool includes:

processing means configured to automatically create an experience base by instrumenting behaviour tests upon executing the modules, said experience base including reference input signals, sets of reference parameters, reference output signals, and collections of results of reference executions relating to said modules, processing means configured to start again said behaviour tests on said modules depending on the corresponding reference input signals and the corresponding sets of reference parameters thus generating test output signals and collections of results of test executions, and processing means configured to compare said test output signals with the corresponding reference output signals and said collections of results of test execution with said corresponding collections of results of reference executions in order to test the non-regression of the designing tool.

The invention also aims at a system for monitoring at least one equipment of an aircraft engine designed by the designing tool according to the characteristics above.

DETAILED DISCLOSURE OF PARTICULAR EMBODIMENTS

Figure 1:
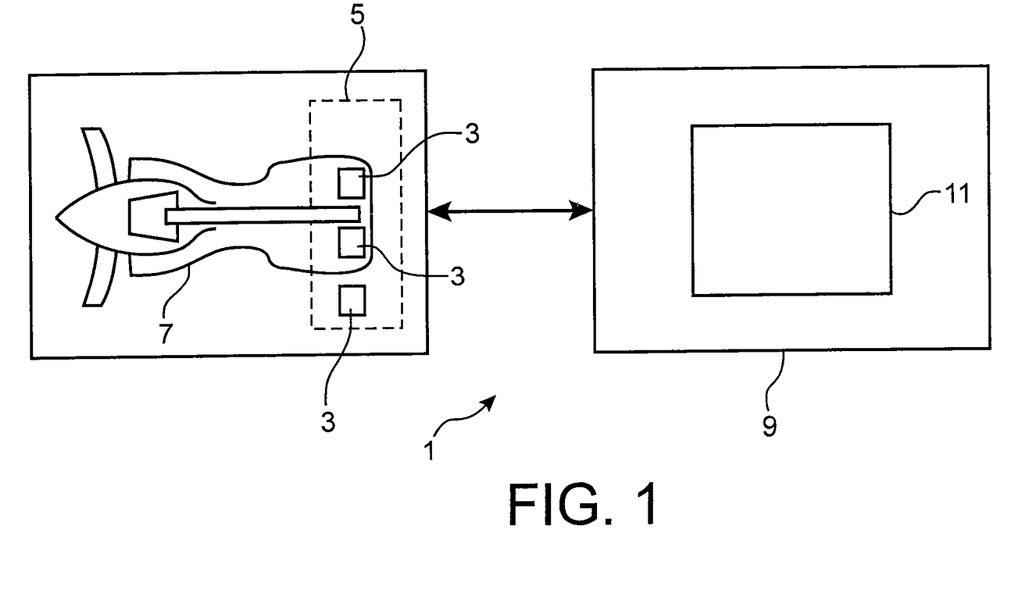
FIG. 1 illustrates hardware means implemented in a monitoring system of an equipment of an aircraft engine.

FIG. 1 illustrates hardware means implemented in the monitoring system of an equipment of aircraft engine.

These hardware means 1 include sensors 3 for measuring data about a particular equipment 5 of an aircraft engine 7 and its environment and information processing means 9 such as a calculator or computer for executing one or more computer programs comprising program code instructions, stored in the storage means of the computer and designed to implement a monitoring system 11 of the equipment 5.

The monitoring system 11 is configured to receive measurements specific to the equipment 5 and to deliver a result diagnosing the state of this equipment.

More particularly, the monitoring system 11 is configured to collect and digitize the specific measurements acquired by the sensors 3 on the equipment 5 of the engine 7 and its environment. The monitoring system 11 is also configured to define specific variables giving indications about physical or logical elements of the equipment 5.

The monitoring system 11 can also be configured to standardise or normalise these specific variables and to build signatures or vector of anomalies representative of the behaviour of the equipment 5.

The monitoring system 11 also enables scores to be evaluated in order to diagnose or detect whether the signature of anomaly reveals an anomaly. Depending on the score value relative to a predefined threshold, the monitoring system 11 can generate a warning indicating that an anomaly is detected.

The monitoring system 11 can also be used to identify or classify detected anomalies.

Further, the monitoring system 11 can be used to make prognostics and decisions.

Thus, depending on the application type, the monitoring system 11 enables several tasks that can comprise data acquisition, data normalisation, anomaly detection and possibly classification of detecting anomalies to be carried out.

Figure 2:
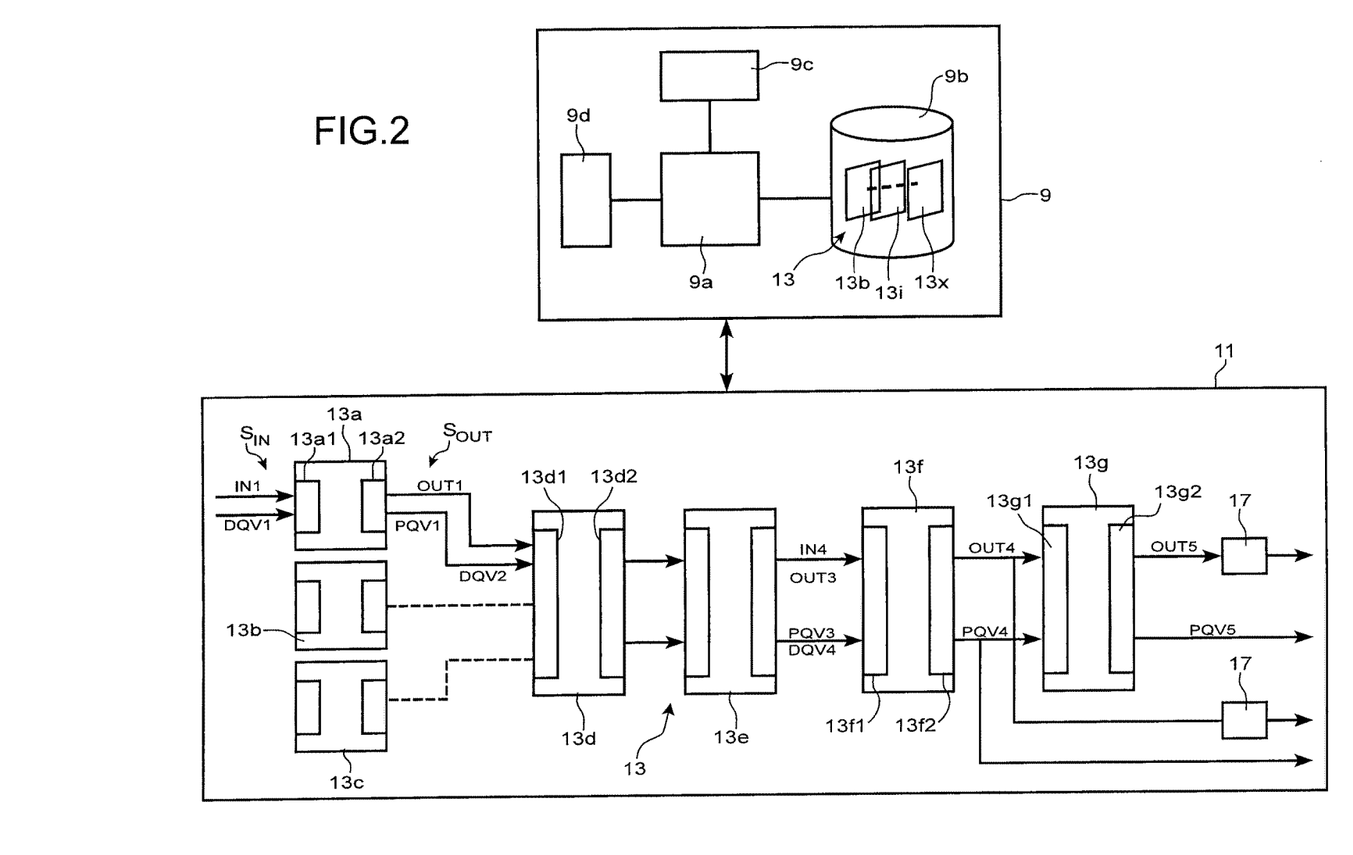
FIG. 2 schematically illustrates a tool for designing the monitoring system of FIG. 1, according to the invention.

FIG. 2 schematically illustrates a tool for designing the monitoring system of an equipment of the aircraft engine, according to the invention.

The designing tool includes information processing means 9 comprising means usually found in a computer: a central processing unit 9a, storage means 9b, input peripherals 9c as well as output peripherals 9d.

The processing means 9 are used to build the monitoring system 11 according to an assembly of different components or modules 13a-13x dedicated to particular tasks of the monitoring system 11.

Indeed, the storage means 9b comprise a plurality of modules 13a-13x which can be accessible for example, from an interactive graphical representation and where each module indicates the specific tasks or executable functions it uses.

Thus, the monitoring system 11 can be built according to a structure assembling a string of modules 13 selected from the plurality of modules 13a-13x depending on the particular tasks of the monitoring system.

The string of modules 13 comprises at least one input module 13a to 13c, at least one output module 13f and 13g, and possibly one or more intermediate modules 13d and 13e.

There are modules for all the tasks necessary to monitoring and detecting anomalies. For example, some modules can be specialised for data acquisition, other for arithmetic tasks, yet others for filtering or operating stochastic data, etc.

Each module integrates algorithmic functions which are invoked when necessary. In fact, there can be a function for initialising the state of the module, another for calibrating or parameterizing, other functions for the algorithm execution and possibly another for drawing the results. The structure of the modules is described by J. Lacaille in a publication entitled «*A Maturation Environment to Develop and Manage Health Monitoring Algorithms*», PHM 2009, San Diego, Calif.

Each module 13i is parameterable by a set of parameters and is provided with an input interface 13a1-13g1 and an output interface 13a2-13g2 enabling it to communicate with at least another module and/or with the sensors 3 and/or with the output peripherals 9d.

Each of the modules 13a-13x is configured to receive via its input interface 13a1-13g1, an input signal $S_{IN}$ and to deliver on its output interface 13a2-13g2, an output signal $S_{OUT}$. The input $S_{IN}$ and output $S_{OUT}$ signals have formats very specific to the monitoring applications of the equipment of the aircraft engine.

Further, the input signal $S_{IN}$ is generally comprised of an input IN and a input quality value DQV (Data Quality Value) associated with the input IN. In the same way, the output signal $S_{OUT}$ is comprised of an output OUT corresponding to a severity (Risk) and an output quality value (that is, a quality value of the severity) PQV (Predictive Quality Value) associated with the output OUT. It will be noted that an input can include several unit inputs and in the same way, an output can include several unit outputs.

More particularly, an input module 13a corresponds to a data acquisition module configured to receive via its input interface 13a1, an input signal comprised of an input IN1 corresponding to measurements specific to the equipment 5 and its environment from the sensors 3 and an input quality value DQV1 associated with the specific measurements. In particular, the processing means 9 assign a predetermined quality value DQV1 to the specific measurements. For example, at first, the processing means 9 assign a quality value DQV1 equal to one (DQV1=1) to the specific measurements.

Each module is responsible for its output data. Thus, the input module 13a delivers on its output interface 13a2, an output signal comprised of an output OUT1 and an output quality value PQV1. The output signal is recovered by the following module 13d via its input interface 13d1. From module to module, the last module(s) 13f, 13g of the string 13 corresponding to the output module(s) is (are) reached.

More particularly, an output module can correspond to an anomaly evaluation module 13f or a classification module 13g. For example, the module 13f is configured to receive via its input interface 13f1, an input signal from the previous module 13e. The input signal is comprised of an input IN4 corresponding to the output of the previous module (IN4=OUT3) and an input quality value DQV4 corresponding to the output quality value of the previous module (DQV4=PQV3). The module 13f is configured to deliver via its output interface 13f2, an output signal comprised of an output OUT4 corresponding to the result of the monitoring system and a quality value of the result PQV4.

The result OUT4 of the monitoring system 11 is a diagnostic of the anomaly; this is a measurement which reflects an abnormal behaviour of the equipment 5. For example, if the value of the result OUT4 exceeds a predefined threshold, an anomaly detection appears and possibly, generates an alarm 17 on output peripherals 9d with this result is associated an output quality PQV4 indicative of the reliability of the result OUT4. This quality PQV4 which represents an accuracy of each output can be used to modulate all of the decision system that follows. For example, if a result OUT4 exceeds the predefined threshold indicating the existence of an anomaly, but the quality of the result PQV4 is low, then it can possibly be assumed that the anomaly detection is not very reliable.

As the quality of the result depends on the quality of each of the modules, the processing means 9 are configured to compute for each module 13i, the output quality value PQV of the module 13i according to a transfer function associating an inaccuracy of the output OUT in response to an inaccuracy of the input IN using at least one intrinsic quality indicator with the module 13i corresponding to a sensitivity measurement of the module.

In accordance with the invention, the designing tool includes a system of non-regression tests.

Figure 3:
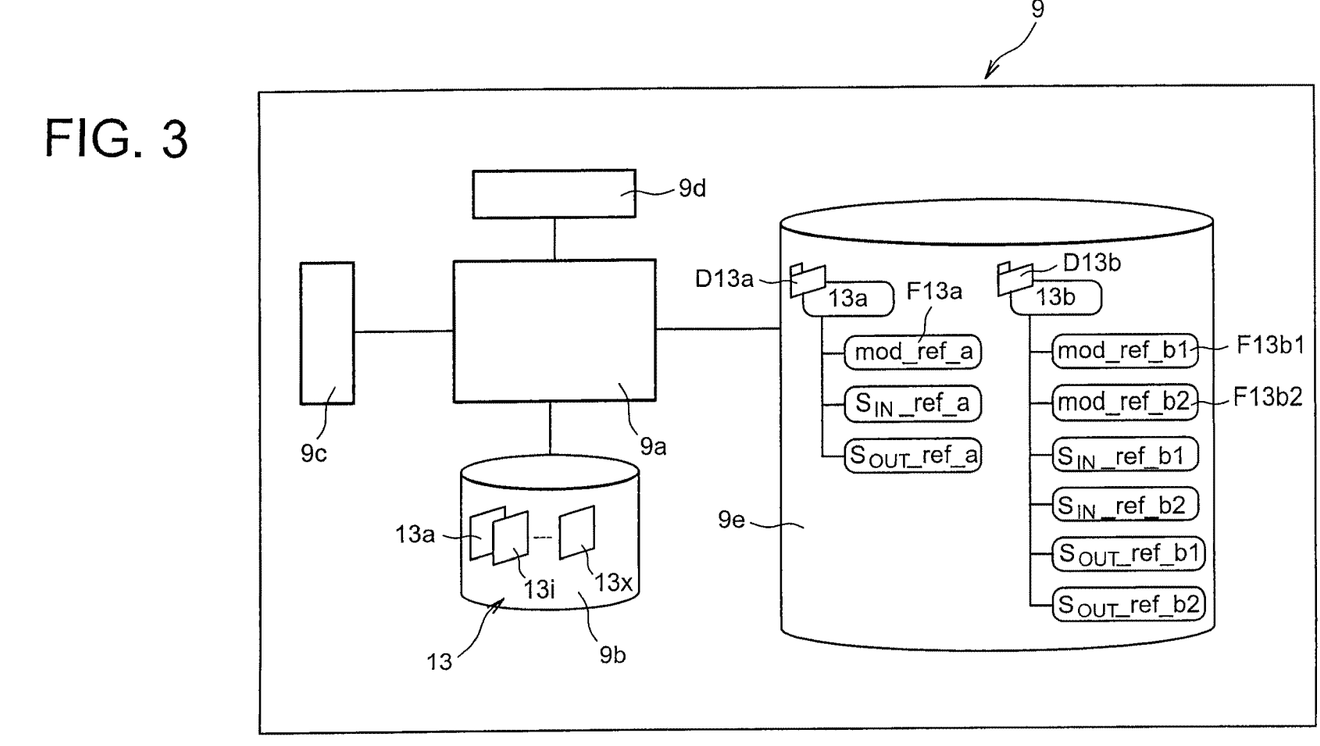
FIG. 3 schematically illustrates a system of non-regression tests of the designing tool, according to the invention.

Indeed, FIG. 3 schematically illustrates a system of non-regression tests of the designing tool, according to the invention.

The purpose of the system of tests is to create first an experience base where are located the tests to be started again and to work out secondly a script of non-regression tests to re-execute for example one by one the experiences recorded in the base.

The system of non-regression tests includes processing means 9 including a central processing unit 9a, storage means 9b, 9e and input 9c and output 9d peripherals.

Advantageously, the system of non-regression tests is integrated into the designing tool enabling the same information processing means 9 to be used.

These processing means 9 are configured to automatically create an experience base 9e by instrumenting the behaviour tests upon executing the modules 13a-13x.

Indeed, upon executing a module 13i configured by a given set of parameters on a given input signal $S_{IN}$, the processing means 9 record in the experience base 9e the set of parameters, the input signal $S_{IN}$ as well as the output signal $S_{OUT}$ delivered by the module 13i.

The experience base 9e thus includes reference input signals $S_{IN}$, sets of reference parameters, and reference output signals $S_{OUT}$ associated with the modules 13a-13x.

The processing means 9 also record in the experience base 9e collections of results of reference executions relating to the modules 13a-13x executed. Each collection of results of reference executions includes an execution flow rate of the module concerned as well as the execution duration.

Thus, the processing means 9 instrument the modules 13a-13x to create the experience base 9e by recording for each module instance, the inputs and outputs, the parameterization and the execution results (flow rate, time, etc.). The instrumentation procedure is automatically executed upon initiating an interactive modelling graphical representation for example of the SIMULINK type.

Advantageously, several collections of instances of reference modules are created by the processing means 9 for the different modules. Each module 13i is associated with a collection of instances of reference modules and each instance of reference module is defined by the algorithmic functions of the corresponding module, as well as by its set of reference parameters. Further, each instance of the reference module is associated with a reference input signal, a reference output signal and a collection of results of reference executions. The collection of results of reference executions associated with an instance of reference module can also include the reference execution date, the number of reference observations, the volume of reference data in addition to the reference execution flow rate and the reference execution duration. The instances of modules are stored in a database or file system type storage system.

By way of example, in the case of a file system, the different instances of reference modules of a same module are recorded in different files gazed in a same folder. In other words, each module 13 has a folder in its name. The latter contains a file in the name of the module and each instance of instrumented module as a spreadsheet (for example an EXCEL spreadsheet) in its name in the file. As the instance name, the name of the module associated with a number which is incremented can be given. Both input and output signals are also recorded in the folder of the module.

The results of the execution of the instance are automatically written in the instance spreadsheet. They can be categorized as tables. For example, a first table reminds the name of the module 13, the originating application of the instance of the module (if it comes for example from a SIMULINK graph) and the name of the instance of module. A second table can include information about the module (in particular its author, its creating date) for also checking whether it is testable, whether it has a graphical output and the number of elements it takes in input and in output. A third table can describe the parameterizing of the instance of module where are located the values or sets of parameters at the time of the execution but also their description which are useful for non-regression tests. A fourth table can contain the name of the input and output signals which have been recorded in the experience base 9e following the instrumentation. Finally, in a last table, the result of the execution of the module (date, processing time, number of observations, module flow rate, and data volume) can be found, which will be used for the non-regression tests.

The example of FIG. 3 shows two folders D13a and D13b associated with two different modules 13a and 13b. The first folder D13a comprises a file F13a in the name of the module 13a including an instance spreadsheet in the name of the instance of reference module mod_ref_a defined by the algorithmic functions of the first module 13a, the set of reference parameters as well as the result of execution. The first folder D13a also comprises data corresponding to an input signal $S_{in}$_ref_a and an output signal $S_{OUT}$_ref_a. The second folder D13b comprises two files F13b1 and F13b2 each comprising an instance of reference module mod_ref_b1, mod_ref_b2 and the data corresponding to two input signals $S_{in}$_ref_b1, $S_{in}$_ref_b2 and two output signals $S_{OUT}$_ref_b1 and $S_{OUT}$_ref_b2.

Figure 4:
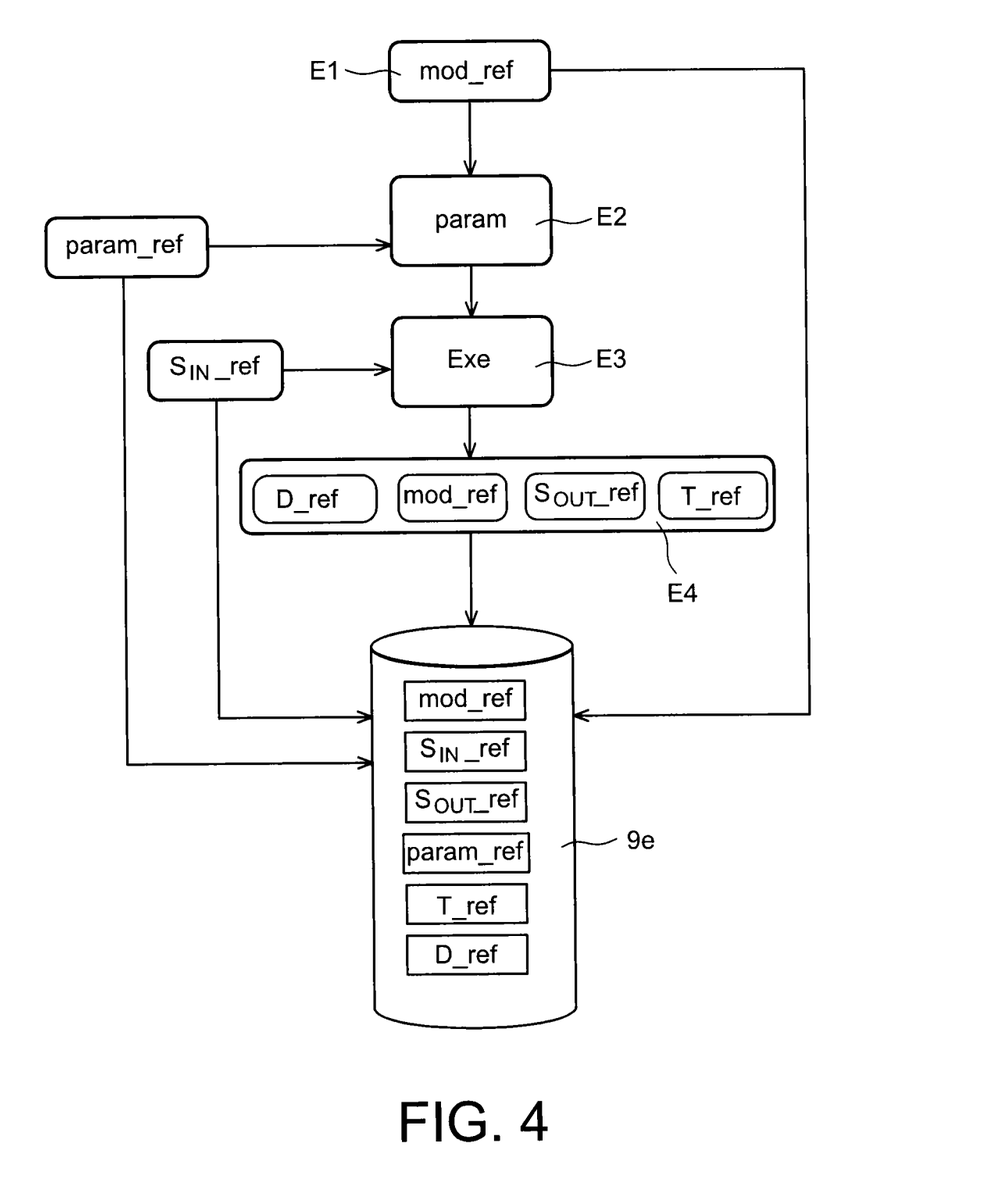
FIG. 4 schematically illustrates an instrumentation of a module upon creating the experience base, according to the invention.

FIG. 4 schematically illustrates an instrumentation of a module upon creating the experience base, according to the invention.

At first, it is considered that the instrumentation option is activated. It will be noted that the operator can intentionally activate or deactivate the instrumentation option used for creating the experience base.

In step E1, the instance of reference module mod_ref associated with the module is recorded in the experience base 9e. For example, at each instrumentation of a new instance of module, a spreadsheet is created and added to the file bearing the same name of the module contained in the folder assigned to the module.

In step E2, a set of reference parameters param_ref is assigned to the instance of reference module mod_ref and the same set of parameters is recorded in association with the instance of reference module. The set of parameters is for example indicated on the spreadsheet assigned to the instance of module.

In step E3, the instance of reference module mod_ref is executed on an input signal of $S_{IN}$_ref which is also recorded in association with the instance of reference module.

In step E4, the execution flow rate D_ref, the output signal $S_{OUT}$_ref, the execution duration T_ref, and the execution date date_ref are also recorded in association with the instance of reference module. These data are for example indicated in the instance spreadsheet of the module.

The experience base 9e thus allows access to the results of execution of the modules and to the inputs and outputs to be facilitated in order to start again the tests.

Indeed, the reference input signals $S_{IN}$_ref, the sets of reference parameters param_ref, the reference output signals $S_{OUT}$_ref, as well as the collections of results of reference executions (D_ref, T_ref, date) make up behaviour tests on the different modules. Starting again the tests of the experience base 9e and comparing the results obtained with those recorded then enable the non-regression of the modules of the designing tool to be tested.

More particularly, the processing means 9 are configured to start again the behaviour tests on the modules 13 depending on the corresponding reference input signals and the corresponding sets of reference parameters recorded in the experience base 9e. The modules 13 then generate test output signals and collections of results of test executions that the processing means 9 respectively compare with the corresponding reference output signals and with corresponding collections of results of reference executions.

It will be noted that starting again the execution of a module with the same parameterizing and the same data in input enables to check whether the output data and their quality have been impacted by a possible modification on the code of the module or on its environment.

Figure 5:
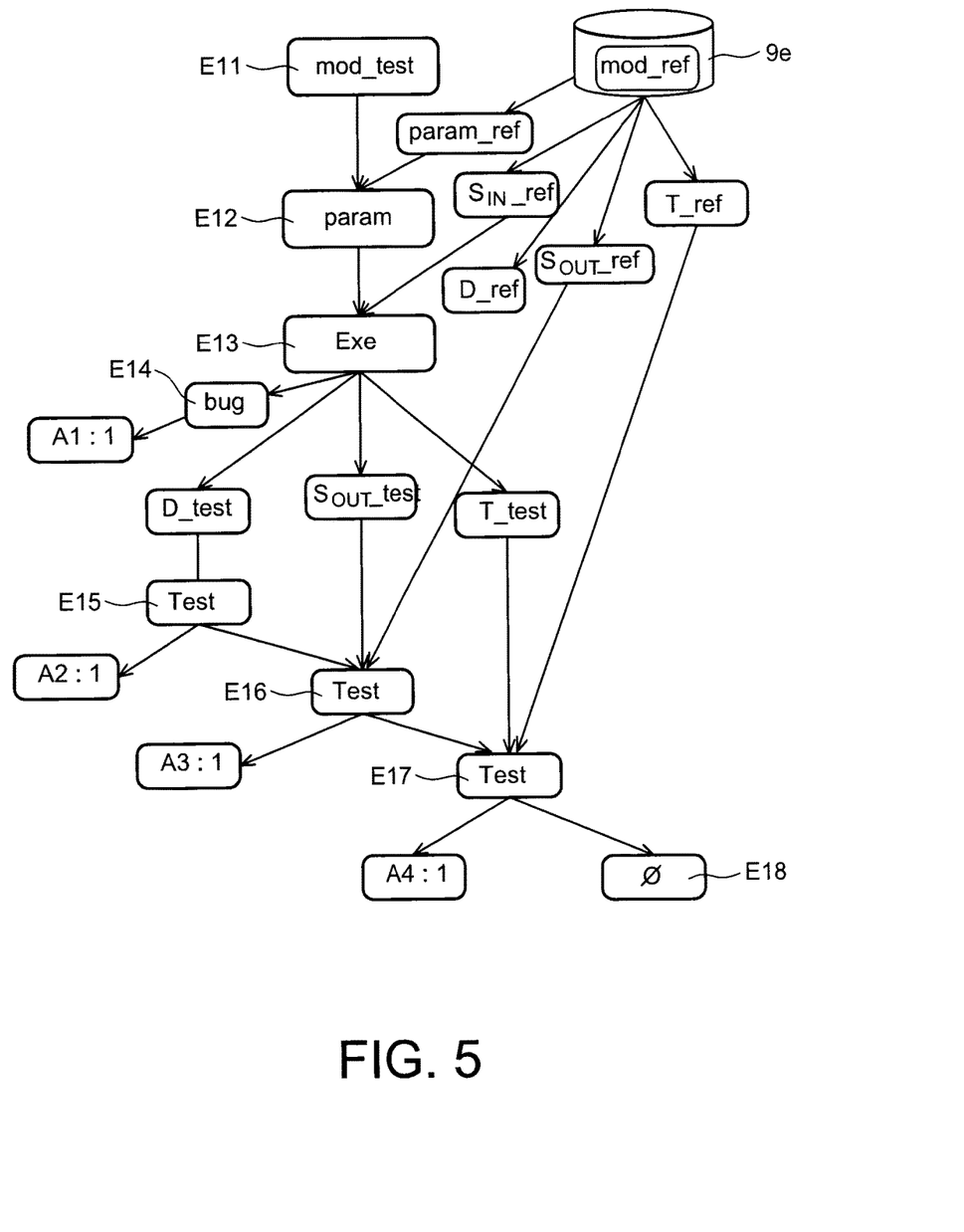
FIG. 5 schematically illustrates a method of non-regression tests of a module to be tested, according to the invention.

FIG. 5 schematically illustrates a method of non-regression tests of a module to be tested, according to the invention.

This method consists in creating for each module 13, a new instance which will be called instance of test module which will be parameterized in the same way as the first instrumented instance (i.e., the corresponding reference instance). Then, the results at the end of the execution of the instance of test module are checked whether they are the same as the reference results.

More particularly, in step E11, the processing means 9 are configured to create a collection of instances of test module mod_test associated with the corresponding collection of instances of reference module corresponding to the module to be tested. For the sake of simplifying, the example of FIG. 5 shows the creation of a single test module mod_test associated with an instance of the reference module mod_ref of the module to be tested.

In step E12, the processing means 9 assign for each instance of test module mod_test the set of reference parameters param_ref of the instance of the corresponding reference module mod_ref.

In step E13, the processing means 9 execute each instance of test module mod_test on the reference input signal $S_{IN}$_ref of the corresponding instance of reference module mod_ref.

If a crash or bug is detected E14, then a regression alert A1 of the module is triggered by the processing means 9. Otherwise, the execution (step E13) of the instance of test module mod_test generates a test output signal $S_{OUT}$_test and a collection of corresponding results of test executions. The collection of results of test executions includes a test execution flow rate D_test, a test execution duration T_test, and possibly the test date, a number of test observations and the test data volume.

In step E15, the processing means 9 compare the test execution flow rate D_test of each instance of test module with a reference execution flow rate D_ref of the corresponding instance of reference module. For example, the processing means 9 compute an execution flow rate deviation between the test execution flow rate D_test of each instance of test module and the reference execution flow rate D_ref of the corresponding instance of reference module. This deviation in execution flow rate is compared with a flow rate threshold. If the flow rate threshold is exceeded, then a regression alert A2 of the module is triggered, otherwise one proceeds to step E16. It will be noted that the reference or test execution flow rate is a standardised flow rate independent of the processing means on which the code is executed. The processing rate, since it is generic, is estimated by computing after calibration tests of the current processing means with respect to reference processing means.

In step E16, the processing means 9 compare the test output signal $S_{OUT}$_test of each instance of test module with the reference output signal $S_{OUT}$_ref of the corresponding instance of reference module. For example, the processing means 9 check a non-regressive equality between the test output signal $S_{OUT}$_test of each instance of test module and the reference output signal $S_{OUT}$_ref of the corresponding instance of reference module. It will be noted that the test or reference output signal includes of course the calculated values but also further information as names of variables, their unities, sizes, etc. Thus, it is first ensured that the signification or type of signals, their size, indices are identical and then their content or value are compared.

The equality between two signals depends on the nature of the signals (being discrete or continuous). For a discrete value, the equality between the signals is a normal equality. However, for a continuous value, it can for example be considered that two signals are equal if the deviation is smaller than a proportion of the normal variance of the signal.

It will be noted that in fairly rare cases, some algorithms can have a non-deterministic (called stochastic) behaviour. In this case, a distance function is used to compare the signals. More particularly, the distributions for each signal (reference and current) are compared in order to check that the outputs come from paths having an analogous direction. For example, the comparison can consist in measuring the likelihood of the current output (test signal) in view of a series of possible outputs (reference signals). Another comparing method can consist in boiling down to the deterministic case still generating the same sequence of pseudo random numbers by the processing means.

If the non-regressive equality is not proved, then a regression alert A3 of the module is triggered, otherwise, one proceeds to step E17.

In step E17, the processing means 9 finally compare the test execution duration T_test of each instance of test module with the reference execution duration T_ref of the corresponding instance of reference module. For example, the processing means 9 compute a deviation in execution duration between the test execution duration T_test of each instance of test module and the reference execution duration T_test of the corresponding instance of reference module. This deviation in execution duration is compared with a predetermined duration threshold. For example, the threshold can be selected such that the processing duration does not increase by more than 15%. If the duration threshold is exceeded, then a regression alert A4 of the module is triggered, otherwise, it is indicated in step E18 that the module does not have regression. As in step E15, it will be noted that the reference or test execution duration is a standardised duration independent of the processing means on which the code is executed.

Thus, a regression alert is automatically triggered in case at least one non-regression test is not validated for a module. In particular, the system of tests can deliver a Boolean signal: 1 if the module has regressed and 0 otherwise.

Advantageously, a regression report is automatically edited with the alert. This report includes an identifier of each module concerned as well as the corresponding non-regression test.

Alternatively, if the test output is 1 (i.e., the module has regressed), the report is not automatically edited and a dialog box will ask the user whether he/she wants to edit a regression report.

Advantageously, the report contains all the information about the module: its name, author, creation date, etc. It also contains a summary of the information contained in the tables of the instance spreadsheet concerned by the regression. This allows to know what has been taken as reference for this instance of module. Finally, the report contains the results of tests, in particular the new execution times and the flow rate. For the result of tests on the output signals, the report can for example include a graph of the reference output signal and another for the test output signal for the report reader to be able to have an idea of the difference between both.

Advantageously, the non-regression tests are executed in an automated way.

According to a first embodiment, the processing means 9 travel the entire experience base 9e to test one by one the instances of reference modules that can be found therein.

According to a second embodiment, the processing means 9 check the dates of the non-regression tests to reexecute those which have not been tested for a long time. This second embodiment enables the execution time cost to be reduced.

According to a third embodiment, when a user starts an execution of module in instrumentation mode and this instance has already been instrumented, a message signals it to him/her. Further, another message can ask him/her if he/she rather wants to start a non-regression test on the module in question. Starting the test will thus be semi-automatic in this case.

The non-regression tests according to the invention ensure that the designing tool properly operates and that any modification of a code or module does not introduce mistakes in designing the monitoring system of the aircraft engine.

The invention claimed is:

1. A method of non-regression tests of a tool for designing a monitoring device of an aircraft engine, said designing tool including modules used to build the monitoring device, each module integrating algorithmic functions dedicated to specific tasks and being configured by a set of parameters, each module being adapted to be executed on an input signal to deliver an output signal, the method comprising:
    automatically creating an experience base by instrumenting behavior tests upon executing the modules, said experience base including reference input signals, sets of reference parameters, reference output signals, and collections of results of reference executions relating to said modules,
    starting again said behavior tests on said modules depending on the corresponding reference input signals and the corresponding sets of reference parameters thus generating test output signals and collections of results of test executions, and
    comparing said test output signals with the corresponding reference output signals and said collections of results of test executions with said corresponding collections of results of reference executions in order to test the non-regression of the designing tool,
    wherein the method further comprises, upon executing a module, creating the experience base including:
        creating collections of instances of reference modules for the different modules, each module being associated with a collection of instances of reference modules and each instance of reference module being defined by the algorithmic functions of the corresponding module, and its set of reference parameters, each instance of reference module being associated with a reference input signal, a reference output signal, and a collection of results of reference executions, and
        recording the different instances of reference modules of a same module in a storage system.

2. The method according to claim 1, wherein the collection of results of reference executions associated with an instance of reference module includes a reference execution flow rate and a reference execution duration.

3. The method according to claim 1, wherein the non-regression test of a module to be tested includes:
    creating a collection of instances of test module associated with the collection of instances of reference module corresponding to said module to be tested,
    assigning for each instance of test module the set of reference parameters of the instance of the corresponding reference module,
    executing each instance of test module on the reference input signal of the instance of the corresponding reference module to generate a test output signal and a corresponding collection of results of test executions, said collection of results of test executions including a test execution flow rate and a test execution duration,
    comparing the test execution flow rate of each instance of test module with the reference execution flow rate of the instance of the corresponding reference module,
    comparing the test output signal of each instance of test module with the reference output signal of the instance of the corresponding reference module, and
    comparing the test execution duration of each instance of test module with the reference execution duration of the instance of the corresponding reference module.

4. The method according to claim 3, wherein the non-regression test of said module to be tested includes:
    calculating an execution flow rate deviation between the test execution flow rate of each instance of test module and the reference execution flow rate of the instance of the corresponding reference module, and comparing said execution flow rate deviation with a flow rate threshold,
    checking a non-regressive equality between the test output signal of each instance of test module and the reference output signal of the instance of the corresponding reference module, and
    calculating an execution duration deviation between the test execution duration of each instance of test module and the reference execution duration of the instance of the corresponding reference module, and comparing said execution duration deviation with a duration threshold.

5. The method according to claim 1, further comprising a reexecution one by one of the instances of reference modules recorded in the experience base in order to test the non-regression of the different modules.

6. The method according to claim 1, further comprising automatically triggering a regression alert in case the non-regression test is not validated for at least one module, the alert being accompanied by a regression report including an identifier of each module concerned as well as the corresponding non-regression test.

7. A system of non-regression tests of a tool including a processor coupled to a memory storing executable software instructions for designing a monitoring device of an aircraft engine, said designing tool including modules used to build the monitoring device, each module integrating algorithmic functions dedicated to specific tasks and being configured by a set of parameters, each module being adapted to be executed on an input signal to deliver an output signal, the system comprising:
    processing means configured to automatically create an experience base by instrumenting behavior tests upon executing the modules, said experience base including reference input signals, sets of reference parameters, reference output signals, and collections of results of reference executions relating to said modules, processing means configured to start again said behavior tests on said modules depending on the corresponding reference input signals and the corresponding sets of reference parameters thus generating test output signals and collections of results of test executions, processing means configured to compare said test output signals with the corresponding reference output signals and said collections of results of test executions with said corresponding collections of results of reference executions in order to test the non-regression of the designing tool, and processing means configured to, upon executing a module, create the experience base including:

creating collections of instances of reference modules for the different modules, each module being associated with a collection of instances of reference modules and each instance of reference module being defined by the algorithmic functions of the corresponding module, and its set of reference parameters, each instance of reference module being associated with a reference input signal, a reference output signal, and a collection of results of reference executions, and recording the different instances of reference modules of a same module in a storage system.

8. A tool including a processor coupled to a memory storing executable software instructions for designing a monitoring device of an aircraft engine, including modules used to build the monitoring device, each module integrating algorithmic functions dedicated to specific tasks and being configured by a set of parameters, each module being adapted to be executed on an input signal to deliver an output signal, the tool comprising:

processing means configured to automatically create an experience base by instrumenting behavior tests upon executing the modules, said experience base including reference input signals, sets of reference parameters, reference output signals, and collections of results of reference executions relating to said modules, processing means configured to start again said behavior tests on said modules depending on the corresponding reference input signals and the corresponding sets of reference parameters thus generating test output signals and collections of results of test executions, processing means configured to compare said test output signals with the corresponding reference output signals and said collections of results of test execution with said corresponding collections of results of reference executions in order to test the non-regression of the designing tool, and processing means configured to, upon executing a module, create the experience base including:

creating collections of instances of reference modules for the different modules, each module being associated with a collection of instances of reference modules and each instance of reference module being defined by the algorithmic functions of the corresponding module, and its set of reference parameters, each instance of reference module being associated with a reference input signal, a reference output signal, and a collection of results of reference executions, and recording the different instances of reference modules of a same module in a storage system.

9. A system including the designing tool according to claim 8 and a processor coupled to a memory storing executable software instructions for monitoring at least one equipment of an aircraft engine designed by the designing tool.

* * * * *